United States Patent [19]
Beretta et al.

[11] 4,110,116
[45] Aug. 29, 1978

[54] FOGGED DIRECT POSITIVE SILVER HALIDE EMULSION CONTAINING A CYANINE DYE HAVING AT LEAST ONE BENZOXAZOLE OR BENZOTHIAZOLE NUCLEUS SUBSTITUTED WITH HALOGEN ATOMS

[75] Inventors: Paolo Beretta, Savona; Luigi Valbusa, Savona, both of Italy

[73] Assignee: Minnesota Mining and Manufacturing Company, Saint Paul, Minn.

[21] Appl. No.: 778,135

[22] Filed: Mar. 16, 1977

Related U.S. Application Data

[63] Continuation-in-part of Ser. No. 478,616, Jun. 12, 1974, abandoned.

[30] Foreign Application Priority Data

Jun. 18, 1973 [IT] Italy ............................... 50883 A/73

[51] Int. Cl.[2] .......................... G03C 1/36; G03C 1/28; G03C 1/18

[52] U.S. Cl. .................................. 96/101; 96/133; 96/135; 96/137; 96/138; 96/129; 96/139; 96/140; 96/107; 542/441; 542/442; 542/443; 542/440; 542/473; 542/474; 542/475; 542/476; 542/452

[58] Field of Search ................. 96/130, 137, 101, 100, 96/107-108, 131-138, 129, 139, 140; 260/240.5, 240.6, 240.65; 542/441, 442, 443, 400, 476, 474, 475, 452, 473

[56] References Cited

U.S. PATENT DOCUMENTS

| | | | |
|---|---|---|---|
| 3,338,714 | 8/1967 | Ficken et al. | 96/137 |
| 3,772,030 | 11/1973 | Gilman et al. | 96/101 |
| 3,822,136 | 7/1974 | Sakazume et al. | 96/137 |

*Primary Examiner*—Won H. Louie, Jr.
*Attorney, Agent, or Firm*—Cruzan Alexander; Donald M. Sell; Mark A. Litman

[57] ABSTRACT

New cyanine dyes derived from di-halogen-benzoxazoles and benzothiazoles are desensitizers for silver halide negative emulsions and useful electron acceptor spectral sensitizers for direct positive silver halide emulsions.

13 Claims, 2 Drawing Figures

Figure 1:
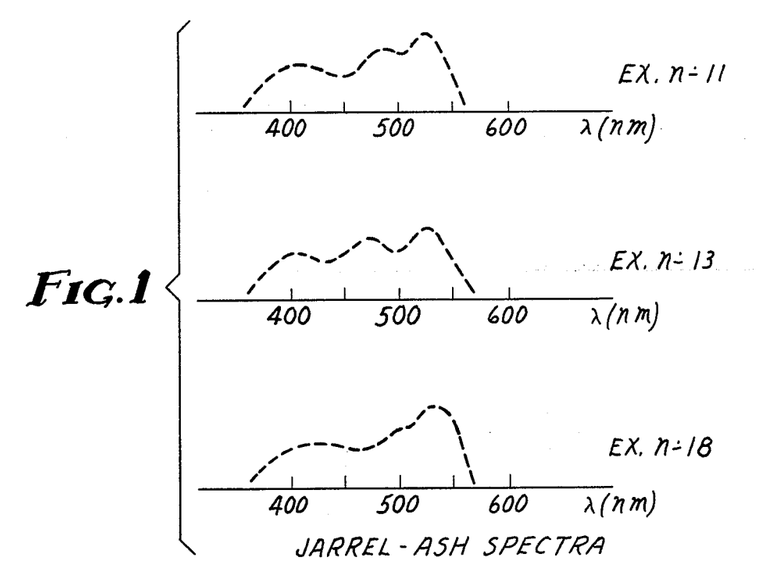

Fig.1 JARREL-ASH SPECTRA

Figure 2:
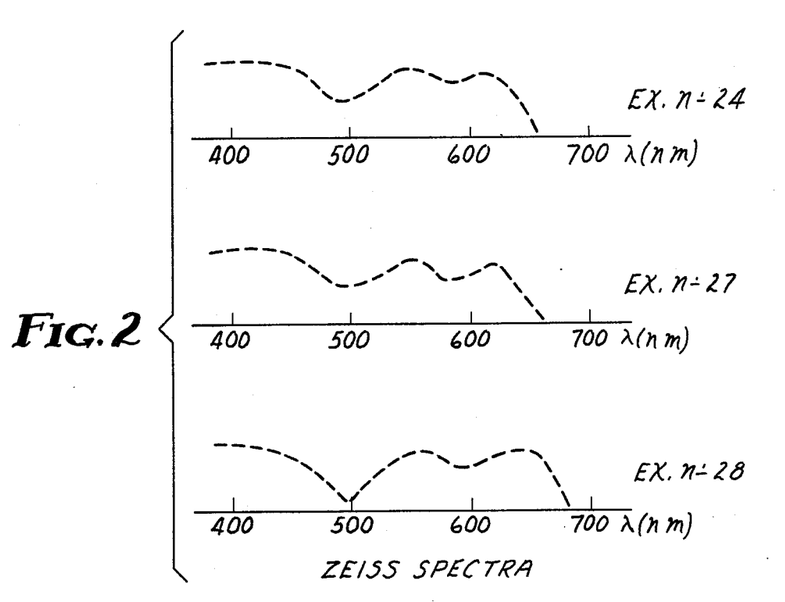

Fig.2 ZEISS SPECTRA

FOGGED DIRECT POSITIVE SILVER HALIDE EMULSION CONTAINING A CYANINE DYE HAVING AT LEAST ONE BENZOXAZOLE OR BENZOTHIAZOLE NUCLEUS SUBSTITUTED WITH HALOGEN ATOMS

CROSS-REFERENCE TO RELATED APPLICATION

This is a continuation-in-part of Ser. No. 478,616, filed June 12, 1974, now abandoned.

The present invention refers to a new class of cyanine dyes and their use as spectral sensitizers in direct positive photographic materials.

The new class of cyanine dyes of the present invention comprises at least one heterocyclic nucleus comprising a 5 or 6-membered ring joined by a methine linkage to a second heterocyclic nucleus or a para-amino phenyl group, the first of said heterocyclic nuclei being a nucleus of the benzoxazole or benzothiazole series having at least 2-halogen atoms as substituents in the phenyl group thereof, joined to the methine linkage in the 2 -position of said nuclei; the second nucleus is a nucleus suitable to complete a cyanine dye. The second nucleus conveniently contains a heterocyclic nitrogen atom or para-amino phenyl group and the methine chain consists of a polyenic chain, containing an equal number of alternating single and double bonds, one terminal carbon atom of which is the carbon atom in the 2-position of a nucleus of the benzoxazole or benzothiazole series, characterized in that it has at least 2-halogen atoms as substituents in the phenyl group, the other terminal carbon atom of the chain being comprised by the second nitrogen containing heterocyclic nucleus. Preferably, the second nucleus of these dyes is a desensitizing nucleus (known in the prior art, for example, as in U.S. Pat. No. 3,431,111, col. 1, line 60 -col. 2, line 6, and F. M. Hamer, "*The Cyanine Dyes and Related Compounds*" pp. 728–729, Interscience Publishers, 1964).

In another embodiment, the present invention refers to merocyanine dyes comprising two nuclei joined together by a methine chain containing an equal number of alternating single and double bonds; the first of said nuclei being a nucleus of the benzoxazole or benzothiazole series, having at least 2 halogen atoms as substituents in the phenyl group, joined to the methine chain through its carbon atom in the 2-position; and the other nucleus being a nitrogen containing ketomethylenic nucleus, having therefore a methylene group activated by a carbonyl group being comprised in the cyclic ring.

In a further embodiment, the present invention relates to styryl dyes comprising a nucleus derived from di-halogen-benzoxazoles, or di-halogen-benzothiazoles, joined through a methine chain having an equal number of alternating single and double bonds, one terminal atom of the chain being the carbon atom in the 2-position of said di-halogenated benzo-azole nuclei, the other terminal carbon atom being in the benzene ring, substituted in the para-position with a dialkylamino group.

In still another embodiment, the present invention refers to dyes containing 2 nuclei of the di-halogen substituted benzoxazole or benzothiazole series joined together by a chain having an equal number of alternating single and double bonds through the carbon atoms in the 2-position of the heterocyclic nucleus. The methine chain joining the two nuclei preferably consists of 3 methine groups.

The new dyes according to the present invention derived from benzoxazoles ane benzothiazoles having two halogen atoms as substituents in the phenyl group, can be represented by the following general formulas:

[1]

[2]

[3]

[4]

wherein:

$Y$ is oxygen or sulfur;

$n$ is a positive integer equal to 2,3,4;

$m$ is 1 or 2;

$n$ is 1 or 2;

$q$ is a positive integer of from 1 to 3;

$R$ and $R_1$, equal or different, represent two halogen atoms, such as chlorine, bromine, fluorine and iodine;

$R_2$ is a hydrogen atom or an alkyl group having from 1 to 4 carbon atoms;

$R_3$ represents an alkyl, cycloalkyl or substituted alkyl group, such as for instance methyl, ethyl, propyl, isopropyl, butyl, hexyl, cyclohexyl, decyl, or dodecyl; an alkoxy-alkyl group, such as for instance $\beta$ -methoxyethyl or $\omega$-buthoxy-butyl; an hydroxy-alkyl group, such as for instance $\beta$ -hydroxyethyl or $\omega$-hydroxybutyl; a carboxy-alkyl group, such as for instance carboxy-methyl, $\beta$ -carboxyethyl, $\delta$ carboxypropyl, $\omega$ -carboxybutyl; a sulfoalkyl group, such as for instance $\beta$ -sulfoethyl, $\delta$ -sulfopropyl, $\delta$-sulfobutyl, $\omega$ sulfobutyl, etc.; a alkoxy-carbonyl-alkyl group, such as for instance $\beta$ -methoxycarbonyl-ethyl or $\omega$-methoxy-carbonyl-butyl; an alkenyl group, such as for instance alkyl, 1-propenyl, 2-butenyl, etc.; an aryl group, such as for instance phenyl, tolyl, xilyl, chlorophenyl, methoxyphenyl, naphthyl, etc.;

$R_4$ represents a hydrogen atom or an alkyl group having from 1 to 3 carbon atoms, such as for instance methyl, ethyl, propyl;

$R_5$ and $R_6$, equal or different, each represent an alkyl group contining containing 1 to 6 carbon atoms;

$X-$ represents an acid anion, such as for instance chloride, bromide, iodide, sulfamate, perchlorate, p-toluensulfonate, methyl-sulfate, etc.;

Z represents the non-metallic atoms required to complete a sensitizing or desensitizing heterocyclic nucleus containing from 5 to 6 atoms in the heterocyclic nucleus, which may also include more than a hetero-atom, such as for instance oxygen, sulfur, selenium or nitrogen, for instance the following nuclei:

a nucleus of the series of the thiazole, for instance thiazole, 4-methyl-5-phenyl-thiazole, 5-methyl-thiazole, 5-phenyl-thiazole, 4,5-dimethyl-thiazole, 4,5-diphenylthiazole, 4-(2-thienyl)-thiazole or 4-nitro-thiazole; of the benzothiazole (e.g. benzothiazole, 4-chlorobenzothiazole, 5-nitro-benzothiazole, 5-chloro-benzothiazole, 6-nitro-benzothiazole, 5,6-dinitro-benzothiazole, 6-chloro-benzothiazole, 7-chloro-benzothiazole, 4-methylbenzothiazole, 5-methyl-benzothiazole, 6-methyl-benzothiazole, 5-bromo-benzothiazole, 6-bromo-benzothiazole, 5-phenyl-benzothiazole, 6-phenyl-benzothiazole, 1-methoxybenzothiazole, 5-methoxy-benzothiazole, 6-methoxy-benzothiazole, 5-bromo-benzothiazole, 5-iodo-benzothiazole, 6-iodo-benzothiazole, 4-ethoxy-benzothiazole, 5-ethoxybenzothiazole, tetrahydro-benzothiazole, 5,6-dimethoxybenzothiazole, 5,6-dioxymethylene-benzothiazole, 5-hydroxybenzothiazole, 6-hydroxy-benzothiazole); of the naphthothiazole (e.g. α-naphthothiazole, β-naphthothiazole, 5-methoxy-β-naphthothiazole, 5-ethoxy-β-naphthothiazole, 8-methoxy-α-naphthothiazole, 7-methoxy-α-naphthothiazole); of the naphthothiazoles having nitro-substituent; of the oxazole (e.g. 4-methyl-oxazole, 4-nitro-oxazole, 5-methyl-oxazole, 4-phenyl-oxazole, 4,5-diphenyl-oxazole, 4-ethyl-oxazole, 4,5-dimethyl-oxazole, 5-phenyl-oxazole); of the benzoxazole (e.g. benzoxazole, 5-chloro-benzoxazole, 5-nitro-benzoxazole, 5-methyl-benzoxazole, 5-phenyl-benzoxazole, 6-nitro-benzoxazole, 6-methyl-benzoxazole, 5,6-dinitro-benzoxazole, 5,6-dimethyl-benzoxazole, 4,6-dimethyl-benzoxazole, 5-methoxy-benzoxazole, 5-ethoxybenzoxazole, 5-chloro-benzoxazole, 5-bromo-benzoxazole, 5-iodo-benzoxazole, 6-methoxy-benzoxazole, 5-hydroxybenzoxazole, 6-hydroxy-benzoxazole); of the naphthoxazole (e.g. α-naphthoxazole, β-naphthoxazole); of the naphthoxazoles substituted with a nitro-group; of the selenazole (e.g. selenazole, 4-methyl-selenazole, 4-phenyl-selenazole); of the benzoselenazole (e.g. benzoselenazole, 4-nitrobenzoselenazole, 6-nitro-benzoselenazole, 5-chlorobenzoselenazole, 5-methoxybenzoselenazole, 5-hydroxybenzoselenazole, 5-nitrobenzoselenazole, tetrahydrobenzoselenazole); of the naphtho-selenazole (e.g. α-naphthoselenazole, β-naphtho-selenazole); of the naphtho-selenazoles substituted with a nitro-group; of the thiazoline (e.g. thiazoline, 4-methyl-thiazoline, 4-nitro-thiazoline, etc.); of the pyridine (e.g. pyridine, 2-pyridine, 5-methyl-2-pyridine, 4-pyridine, 3-methyl-4-pyridine); pyridine substituted with a nitro-group; of the quinoline (e.g. quinoline, 2-quinoline, 3-methyl-quinoline, 5-ethylquinoline, 6-chloro-quinoline, 8-chloro-quinoline, 6-methoxy-quinoline, 8-ethoxy-quinoline 8-hydroxy-quinoline); of the 4-quinoline (e.g. 6-methoxy-4-quinoline, 1-methoxy-4-quinoline, 7-methyl-4-quinoline, 8-chloro-4-quinoline); of the 1-isoquinoline (e.g. 3,4-dihydro-1-isoquinoline); 3-isoquinoline; quinolines having a nitro-substituent; of the 1,1-dialkyl-indolenine (e.g. 1,1-dimethyl-5 or 6-cyano-indolenine, 1,1-dimethyl-5 or 6-nitro-indolenine, 1,1-dimethyl-5-chloro-indolenine); of the imidazole (e.g. imidazole, 1-alkyl-imidazole, 1-alkyl-4-phenyl-imidazole, 1-alkyl-4,5-dimethyl-imidazole); of the benzimidazole (e.g. 1-alkyl-benzimidazole, 1-aryl-5,6-dichloro-benzimidazoles); of the naphthimidazole (e.g. 1-alkyl-α-naphthoimidazole, 1-aryl-β-naphthoimidazole, 1-alkyl-5-methoxy-α-naphtho-imidazole).

The nuclei, wherein Z represents the atoms required to make a nitro-substituted heterocyclic nucleus, give densitizing dyes particularly useful to make direct positive emulsions and materials using such emulsions, according to the present invention. Particularly, the preferred nuclei are selected from the groups formed by nitro-benzothiazoles (e.g. 5-nitro-benzothiazole, 6-nitrobenzothiazole, 5-chloro-6-nitro-benzothiazole); or from the groups formed by the homologous derivatives obtained by substituting sulfur with oxygen or selenium, or from the groups formed by imidazo[4,5-b]quinoxalines (e.g. imidazo[4,5-b]quinoxaline, 1,3-dialkyl-imidazo[4,5-b]quinoxaline, 1,3-diethyl-imidazo[4,5-b]quinoxaline, 6-chloro-1,3-diethyl-imidazo[4,5-b]quinoxaline, 1,3-dialkenyl-imidazo[4,5-b]quinoxaline, 1,3-diallyl-imidazo [4,5-b]quinoxaline, 6,7-dichloro-1,3-diallyl-imidazo [4,5-b]quinoxaline, 1,3-diaryl-imidazo[4,5-b]quinoxaline 1,3-diphenyl-imidazo[4,5-b]quinoxaline, 6-chloro-1,3-diphenyl-imidazo[4,5-b]quinoxaline); or from the groups formed by 3H-pyrrolo[2,3-b]pyridine (e.g. 3,3-dialkyl-3H-pyrrolo[2,3b-]pyridine, 3,3-diethyl or 3,3-dimethyl-3H-pyrrolo[2,3-b]pyridine); or from the groups formed by 3H-nitro-indoles (e.g. 3,3-dialkyl-3H-nitro-indole, 3,3-dimethyl or 3,3-diethyl-5-nitro-3H-indole); from the groups formed by thiazolo[4,5-b]quinoline or formed by nitro-quinoline (e.g. 5-nitro-quinoline, 6-nitroquinoline, etc.).

Q represents the non-metallic atoms required to complete a 5 to 6-membered heterocyclic nucleus, such as for instance a 2-pyrazolin-5-one nucleus (e.g. 3-methyl-1-phenyl-2-pyrazolin-5-one, 1-phenyl-2-pyrazolin-5-one, 1-(2-benzothiazolyl)-3-methyl-2-pyrazolin-5-one, etc.); an isoxazolone nucleus (e.g. 3-phenyl-5(4H)-isoxazolone, 3-methyl-5(4H)-isoxazolone, etc.); an oxindole nucleus (e.g. 1-alkyl-2,3-dihydro-2-oxindoles, etc.); a 2,4,6-triketohexahydro-pyrimidine nucleus (e.g. barbituric acid or 2-thio-barbituric acid and their 1-alkyl derivatives, such as for instance 1-methyl, 1-ethyl, 1-propyl, etc.; 1,3-dialkyl derivatives, such as for instance 1,3-dimethyl, 1,3-diethyl, 1,3-dipropyl, etc.; 1,3-diaryl derivatives, such as for instance 1,3 -diphenyl, 1,3-di(p-chlorophenyl), etc.; 1-aryl derivatives, such as for instance 1-phenyl, 1 -p-chlorophenyl; 1-alkyl-3-aryl derivatives, such as for instance 1-ethyl-3-phenyl, 1-n-heptyl-3-phenyl, etc.); a 2-thio-2,4-thiazolidine-dione nucleus (rhodanine) (e.g. rhodanine 3-alkyl-rhodanine, such as for instance 3-methylrhodanine, 3-ethyl-rhodanine, 3-alkyl-rhodanine; 3-carboxy-alkyl-rhodanines, such as for instance 3-β-carboxy-ethyl-rhodanine, 3-carboxy-methyl-rhodanine, etc.; 3-sulfo-alkyl-rhodanines, such as for instance 3-β-sulfo-ethyl-rhodanine, 3-δ-sulfo-propyl-rhodanine, etc; 3-aryl-rhodanines, such as for instance 3-phenylrhodanine, 3-p-sulfo-phenyl-rhodanine, etc.); a 2-thio-2,4-oxazolidine-dione nucleus (e.g. 3-ethyl-2-thio-2,4-oxazolidin-dione, 3-β-sulfo-ethyl-2-thio-2,4-oxazolidined-ione, 3-p-sulfo-phenyl-2-thio-2,4-oxazolidine-dione, 3-δ-sulfo-butyl-2-thio-2,4-oxazolidine-dione, 3-δ-carboxy-propyl-2-thio-2,4-oxazolidin-dione, etc.); a thianaphthenone nucleus (e.g. 3-(2H)-thianaphthenone, etc.); a 2-thio-2,5-thiazolidine-dione nucleus (e.g. 2-thio-2,5-(3H,4H)-3-ethyl-thiazolidin-dione, etc.); a 2-4-thiazolidine-dione nucleus (e.g. 3-ethyl-2,4-thiazolidine-dione, 3-phenyl-2,4-thiazolidine-dione, 3-α-naphthyl-2,4-thiazolidine-dione, etc.); a thiazolidinone nucleus (e.g. 4-thiazolidinone, 3-ethyl-4-thiazolidinone, 3-phenyl-4-thiazolidinone, 3-α-naphthyl-4-thiazolidinone, etc.); a 2-thiazolin-4-one nucleus (e.g. 2-ethyl-mercapto-2-thiazolin-4-one, 2-alkyl-phenylamino-2-thiazolin-4-one, 2-diphenylamino-2-thiazolin-4-one, etc.); a 2-imino-4-oxazolidinone (i.e. pseudohydantoin) nucleus; a 2,4-imidazolidine-dione (hydantoin) nucleus (e.g. 2,4-imidazolidine-dione, 3-ethyl-2,4-imidazolidine-dione, 3-phenyl-2,4-imidazolidine-dione, 3-α-naphthyl-2,4-imidazolidine-dione, 1,3-diethyl-2,4-imidazolidine-dione, 1-ethyl-3-phenyl-2,4-imidazolidinedione, 1-ethyl-3-α-naphthyl-2,4-imidazolidine-dione, 1,3-diphenyl-2,4-imidazolidine-dione, etc.); a 2-thio-2,4-imidazolidine-dione (i.e. 2-thio-hydantoin) nucleus (e.g. 2-thio-2,4-imidazolidine-dione, 3-ethyl-2-thio-2,4-imidazolidine-dione, 3-ω-sulfobutyl-2-thio-2,4-imidazolidine-dione, 3-β-carboxyethyl-2-thio-2,4-imidazolidine-dione, 3-phenyl-2-thio-2,4-imidazolidinedione, 3-α-naphthyl-2-thio-2,4-imidazolidine-dione, 1-ethyl-3-phenyl-2-thio-2,4-imidazolidine-dione, 1-ethyl-3-α-naphthyl-2-thio-2,4-imidazolidine-dione, 1,3-diphenyl-2-thio-2,4-imidazolidine-dione, etc.).

Except where already limited in the above descriptions of dependent groups, such dependent groups as $R_3$, $X^-$, and the second nucleus (heterocyclic or para-amino phenyl) do not substantially effect the performance of the types by even extreme variation in size. The following limitations are derived mainly from economic considerations in the selection of size limit for dependent groups.

Group $R_3$ is generally preferred to have no more than 18 carbon atoms, more preferred to have no more than 12 carbon atoms and most preferred to have no more than 4 carbon atoms. It is generally preferred to have no more than 8 non-metallic heteroatoms and more preferably no more than 5 such heteroatoms.

The second nucleus is generally preferred to have no more than 50 carbon atoms, more preferably no more than 30, and most preferably no more than 20 carbon atoms. It is generally preferred to have no more than 10 heteroatoms in the second nucleus, with no more than 5 heteroatoms in the heterocyclic ring.

According to the present invention, the dyes represented by general formulas [1], [2], [3], [4] can be conveniently prepared by using new compounds of formula:

[5]

wherein:
R, $R_1$, $R_2$, $R_3$ and $X^-$ have the above mentioned meanings.

The new compounds of formula [5] can be advantageously prepared by cyclizaton of suitable intermediates according to whether Y is oxygen or sulfur.

The symmetrical carbocyanines having general formula [1] can be conveniently prepared by reacting 2 moles of a compound selected among those represented by general formula [5] with 1 mole, or with 1 mole + 100% in excess, of ethyl-ortho-formate or diethoxymethylacetate to prepare carbocyanines (n = 2) wherein $R_4$ is hydrogen; with 1 mole, or with 1 mole + 100% excess, of triethylorthoacetate to prepare carbocyanines (n = 2) wherein $R_4$ is a methyl group; with 1 mole, or with 1 mole + 100% excess, of triethylorthopropionate to prepare carbocyanines (n = 2) wherein $R_4$ is an ethyl group; with trimethoxypropene or acroleynaldehyde dianylhydrochloride to give dicarbocyanines (n = 3), etc.

To prepare the unsymmetrical cyanines of general formula [2], wherein n = 2, 3, 4, a compound selected among those represented by general formula [5] is reacted with a compound selected among those represented by general formula:

[6]

wherein:
n, $R_3$, Z and $X^-$ have the above mentioned meanings;
$R_7$ is an aryl group (such as for instance phenyl, tolyl, etc.); and
$R_8$ is an alkyl group having from 1 to 18 carbon atoms.

The reaction is carried out in an inert solvent in the presence of a basic catalyst.

Particularly, the unsymmetrical cyanines represented by general formula [3], wherein n=2, can be prepared by reacting a compound represented by general formula [5] with a compound selected among those represented by general formula:

[7]

wherein:
$R_3$, Z and m have the above-mentioned meanings.

The condensations are conveniently carried out in acetic acid or acetic anhydride; the dye separated by cooling is purified by one or more crystallizations from a suitable solvent.

Styryl dyes having general formula [3] can be prepared by heating a mixture of a compound selected among those represented by general formula [5] with a suitable N,N-di-substituted-p-amino-benzaldehyde or N,M-di-substituted-p-amino-cinnamaldehyde, preferably in a suitable solvent and in the presence of a basic catalyst.

The merocyanines represented by general formula [4] can be prepared by reacting a compound of general formula [5] with a compound of general formula:

[8]

wherein:
R₀ represents an aryl group (such as for instance phenyl, tolyl, etc.);
R₁₀ represents an alkyl group having from 1 to 12 carbon atoms. The reactions are conveniently carried out in an inert solvent and in the presence of a basic catalyst.

The following examples will better illustrate the present invention in its different aspects, viz. preparation of intermediates, dyes as well as their use in light-sensitive emulsions.

EXAMPLE 1

2-acetylamino-4,6-dibromo-phenol

A mixture of 89 g. of 2-nitro-4,6-dibromo-phenol, 270 ml. of methyl alcohol, 50ml. of 30% NaOH aqueous solution and 2,400 ml. of demineralized water was heated up to 50°–55° C., obtaining a yellow solution. To this solution, 178 g. of Na₂S₂O₃ were added in small portions, by keeping the temperature at 50° C. The reaction mixture was then stirred for 30 minutes by keeping the temperature at 65° C. and finally for 30 minutes at room temperature. By cooling, 44.2 g. of 2-amino-4,6-dibromo-phenol were obtained, having a melting point equal to 89°–92° C.

44.2 g. of 2-amino-4,6-dibromo-phenol were processed with 85.5 ml. of acetic anhydride keeping the temperature under 50° C. By cooling, the 2-acetylamino-4,6-dibromo-phenol separated; it was collected on a filter and crystallized from ethyl alcohol. 30 g. of pure product were obtained. M.P. = 175°–176° C.

Percent analysis: C% calculated 31.10, found 31.11.
H% calculated 2.28, found 2,29.
N% calculated 4.53, found 4.54.

EXAMPLE 2

2-methyl-5,7-dibromo-benzoxazole

A mixture of 40 g. of 2-acetylamino-4,6-dibromo-phenol and 1.5 g. of anhydrous sodium acetate was heated at 180° C. for some minutes, obtaining a liquid slurry which was distilled under vacuum, by collection the fraction passed from 150° C. to 155° C. at 1.6 mm. Hg. The distilled oil by standing became a solid which was crystallized from ligroin, obtaining 25 g. of 2-methyl-5,7-dibromo-benzoxazole. M.P. = 122°–124° C.

Percent analysis: C% calculated 33.02, found 33.14. H% calculated 1.73, found 1.70. N% calculated 4.81, found 4.92.

EXAMPLE 3

2-acetylamino-5-methyl-4,6-dichloro-phenol

To a mixture of 68.4 g. of 2-amino-5-methyl-4,6-dichloro-phenol hydrochloride and 96 ml. of N,N-diethylaniline in 750 ml. of acetone, 23.4 ml. of acetyl chloride were added slowly by keeping the temperature under 20° C. At the end, the reaction mixture was heated to reflux for an hour. After cooling, the solution was poured into water; the solid product, thus obtained, was collected on a buckner, washed with water until the washings were neutral and dried in a desicator at 50° C. The raw product obtained was purified by crystallization from ethyl alcohol, yielding 44 g. of a pure product with M.P. = 175°–176.5° C.

EXAMPLE 4

2,6-dimethyl-5,7-dichloro-benzoxazole

A mixture of 79 g. of 2-acetylamino-5-methyl-4,6-dichloro-phenol and 3.6 g. of anhydrous sodium acetate was heated at 180° C. for some minutes. The liquid obtained was distilled under vacuum, collecting the fraction passed from 140° C. to 145° C. at 1.2 mm. Hg. The distilled oil became a mass of crystals which was purified by crystallization from ligroin. 36 g. of pure base were obtained. M.P. = 80°–82° C.

Percent analysis: C% calculated 50.05, found 50.02. H% calculated 3.27, found 3.16. N% calculated 6.49, found 6.55.

EXAMPLE 5

2,3-dimethyl-5,7-dibromo-benzoxazole methyl-sulfate

A mixture of 2.9 g. of 2-methyl-5,7-dibromo-benzoxazole and 2.5 ml. of dimethyl-sulfate were heated at 150° C. for 5 minutes. By cooling, a solid cake was obtained. It was then ground in a mortar by washing repeatedly with ethyl ether. The product was employed without further purification for the dye synthesis.

EXAMPLE 6

2-methyl-3-ethyl-5,7-dibromo-benzoxazole ethyl-sulfate

The compound was prepared as described in Example 5 using diethysulfate instead of methylsulfate.

EXAMPLE 7

2,6-dimethyl-3-ethyl-5,7-dichloro-benzoxazole ethyl-sulfate

The compound was prepared as described in Example 5 using 2,6-dimethyl-5,7-dichloro-benzoxazole and diethylsulfate.

EXAMPLE 8

2,6-dimethyl-3-ethyl-5,7-dichloro-benzoxazole p-toluene sulfonate

A mixture of 2.1 g. of 2,6-dimethyl-5,7dichloro-benzoxazole and 2 g. of ethyl-p-toluene-sulfonate was heated at 150° C. for 30 minutes. By cooling, a pick cake was obtained. It was ground in a mortar by washing repeatedly with ethyl ether. The product, thus obtained, was dried and used without further purification for the synthesis of dyes.

EXAMPLE 9

Anhydro-2,6-dimethyl-3-γ-sulfo-propyl-5,7-dichloro-benzoxazole hydroxide A mixture of 4.32 g. of 2,6-dimethyl-5,7-dichloro-benzoxazole and 3.66 g. of 1,3-propane-sulfone was heated at 150° C. for 15 minutes. The pick cake, obtained by cooling, was ground in a mortar by washing repeatedly with ethyl ether. The hygroscopic solid, thus obtained, was dried under vacuum and used immediately without any further purification for the dye synthesis.

EXAMPLE 10

2-methyl-5,6-dichlorobenzothiazole

A mixture of 66 g. of 2,4,5-trichloro-1-nitrobenzene and 120 ml. of ethyl alcohol was poured into a 750 ml. flask equipped with reflux condenser, mechanical stirrer and dropping funnel and heated to reflux. Through the funnel, a sodium disulfide aqueous solution, obtained by dissolving 72 g. of $Na_2S \cdot H_2O$ and 9.6 g. of sulfur in 45 ml. of boiling water, was dropped into. At the end, the reaction mixture was heated to reflux under stirring for half an hour. By cooling, a gum separated which became solid on standing overnight and by washing with hot water.

61.8 g. of 2,2'-dinitro-4,5-4',5'-tetrachlorodiphenyl-disulfide was obtained and poured immediately into a 1,500 ml. keller equipped with mechanical stirrer, thermometer and reflux condenser, containing 394 ml. of acetic acid and mounted on a sand bath. To this mixture, heated up to 90° C., 112 g. of Zn-powder was added in small portions. At the end the heating was continued for two hours and a half, then 45 ml. of acetic anhydride were added and the reflux heating continued for 2 hours. The hot mixture was hot filtered on a buckner, washing the solid with hot acetic acid and then cooled and made basic with ammonia. The gum obtained on standing became solid. It was then ground in a mortar by washing with ammonia aqueous solution and then air dried. The solid was distilled under reduced pressure collecting the fraction from 190° C. to 200° C. at 2 mm. Hg. The distilled oil, on standing, became a mass of white crystals which were purified by crystalization from ligroin. 20 g. of pure base were obtained, having a melting point equal to 165°–170° C.

Percent analysis: N% calculated 6.4, found 6.0.

EXAMPLE 11

3,3'-diethyl-5,7-5',7'-tetrabromo-oxacarbocyanine perchlorate

A mixture of 2.91 g. of 2-methyl-5,7-dibromobenzoxazole and 2.6 g. of ethyl-p-toluene-sulfonate was heated to 140° C. for 4 hours. The pick cake obtained by cooling was ground in a mortar by washing repeatedly with ethyl ether. The resulting solid was dissolved in 15 ml. of anhydrous pyridine and 2.5 ml. of triethylorthoformiate and the solution was heated to reflux for 15 minutes. By cooling, the dye separated as gum which was dissolved in a minimum quantity of ethyl alcohol. An ammonium perchlorate aqueous solution was added to the dye solution. By standing, the raw dye separated; it was collected on a filter, washed and crystallized from ethyl alcohol. 0.85 g. of pure dye were obtained having an M.P. = 283°–6° C. λ max. = 495 nm. (ethyl alcohol).

EXAMPLE 12

3,3'-diethyl-5,7-5',7'-tetrabromo-oxacarbocyanine iodide

The dye was prepared as described in Example 11, using potassium iodide instead of ammonium perchlorate. After crystallization from ethyl alcohol, a pure dye was obtained, having a M.P. = 278°–281° C. λ max = 495 nm. (ethyl alcohol).

EXAMPLE 13

3,3'-dimethyl-5,7,5',7'-tetrabromo-9-ethyl-oxacarbocyanine perchlorate

A mixture of 4.17 g. of 2,3-dimethyl-5,7-dibromobenzoxazole methyl-sulfate in 15 ml. of pyridine and 2.5 ml. of triethyl-ortho-propionate was heated to reflux for an hour. After cooling, the reaction mixture was poured into ethyl ether. The yellow gum separated, was washed with ethyl ether and dissolved in a minimum quantity of hot ethyl alcohol. To this solution, an ammonium perchlorate aqueous solution was added. The dye, separated by cooling, was collected on a buckner, dried under vacuum and crystallized from dimethylformamide, 0.1 g. of pure dye was obtained having a M.P. = 330° C. λ max. = 500 nm. (ethyl alcohol - dimethylformamide).

EXAMPLE 14

3,3',9-triethyl-5,7-5',7'-tetrabromo-oxacarbocyanine perchlorate

The dye was prepared as reported in Example 12 using triethylorthopropionate as condensing agent, instead of triethylorthoformiate. The raw dye was purified by crystallization from ethyl alcohol. M.P. = 281°–4° C. λ max. = 499 nm. (ethyl alcohol).

EXAMPLE 15

3-ethyl-3'-methyl-5,7-dibromo-5',6'-dimethyl-oxacarbocyanine iodide

A mixture of 4.17 g. of 2,3-dimethyl-5,7-dibromobenzoxazole methyl-sulfate and 4.62 g. of 2- ω-acetanilidovinyl-3-ethyl-5,6-dimethyl-benzoxazole-iodide in 20 ml. of anhydrous pyridine and 2 ml. of triethylamine, was heated to reflux for 20 minutes. The reaction solution was chilled into ethyl ether : the separated dye was collected on a filter, dried and crystallized from ethyl alcohol. 1.2 g. of pure dye were obtained. M.P. - 256°–258° C. λ max. = 495 nm. (ethyl alcohol).

EXAMPLE 16

(3-methyl-5,7-dibromo-benzoxazole-2)-(3-ethyl-thiazolidine-2)-trimethine-cyanine iodide A mixture of 2.08 g. of 2,3-dimethyl-5,7-dibromobenzoxazole methyl sulfate and 2.01 g. of 2-ω-acetanilidovinyl-3-ethyl-thiazolidine iodide in 15 ml. of anhydrous pyridine and 1 ml. of triethylamine was heated to reflux for 20 minutes. The raw dye, separated from the reaction mixture by adding ethyl ether, was collected on a buckner and washed repeatedly with ethyl ether. After crystallization from a mixture of ethyl alchol ethyl ether, the pure dye was obtained having a M.P. = 165°–173° C. λ max. = 465 nm. (ethyl alcohol).

EXAMPLE 17

(3-methyl-5,7-dibromo-benzoxazole-2)-(3-ethyl-6-nitro-benzothiazole-2)-trimethinecyanine methyl sulfate A mixture of 2.08 g. of 2,3-dimethyl-5,7-dibromobenzoxazole methylsulfate and 1.25 g. of 2-formyl-methylene-3-ethyl-6-nitrobenzothiazoline in 30 ml. of acetic anhydride, was heated to reflux for 6 minutes. After cooling, the crude dye was collected on a buckner, washed with acetic anhydride ethyl ether and ethyl alcohol and purified by repeatedly boiling with acetic acid. 1.9 g. of pure dye were obtained having an M.P. = 297°–299.5° C. λ max, = 539 nm. (ethyl alcohol-dimethylformamide).

EXAMPLE 18

3,3' -diethyl-5,7-5',
7'-tetrachloro-6,6'-dimethyl-oxacarbocyanine ethyl sulfate A solution of 3.6 g. of 2,6-dimethyl-3-ethyl-5,7-dichloro-benzoxazole ethyl-sulfate in 20 ml. of anhydrous pyridine and 3 ml. of triethyl-ortho-formiate was boiled for 6 minutes and after cooling poured into ethyl ether. The crude dye was collected on a buckner, washed repeatedly with ethyl ether and then boiled with ethyl alcohol. After recrystallization, 1.0 g. of pure dye was obtained having an M.P. - 263°-270° C. λ max. = 497 nm. (ethyl alcohol-dimethylformamide).

EXAMPLE 19

Anhydro-3,3'-(δ-sulfo)-propyl-5,7-5',
7'-tetrachloro-6,6'-dimethyl-oxacarbocyanine hydroxide A mixture of 3.38 g. of anhydro-2,6-dimethyl-3-δ-sulfo-propyl-5,7-dichloro-benzoxazole-hydroxide in 25 ml. of nitrobenzene and 5 ml. of triethylorthoformiate was heated to reflux for 15 minutes. After cooling, the solution was poured into ethyl ether and acetone, the crude dye was collected and boiled with water. After crystallization from a 3:1 mixture of ethyl alcohol and dimethylformamide, 0.8 g. of pure dye was obtained. M.P. - 299°-303° C. λ max. = 499 nm. (ethyl alcohol-dimethylformamide).

EXAMPLE 20

(3-ethyl-5,7-dichloro-6-methyl-benzoxazole-2)-(3-ethyl-6-nitro-benzothiazole-2)-trimethinecyanine ethyl-sulfate A mixture of 3.6 g. of 2,6-dimethyl-3-ethyl-5,7-dichloro-benzoxazole ethyl sulfate and 2.5 g. of 2-formyl-methylene-3-ethyl-6-nitro-benzothiazoline in 15 ml. of acetic anhydride and 7 ml. of acetic acid, was boiled for 6 minutes. After cooling, the reaction mixture was poured into ethyl ether: the dye separated as gum. It was then boiled with absolute ethyl alcohol until a dark-green powder was obtained.

The crude dye was purified by boiling it repeatedly with absolute ethyl alcohol and the pure dye collected on a buckner and washed with ethyl ether. 1.7 g. of pure dye dye were obtained. M.P. = 194°-197° C. λ max. = 541 nm. (ethyl alcohol-dimethylformamide).

EXAMPLE 21

3-ethyl-5-[(3-ethyl-5,7-dichloro-6-methyl-benzoxazoline-2-ylidene)-ethylidene]-rhodanine 4.44 g. of 2,6-dimethyl-3-ethyl-5,7-dichlorobenzoxazole ethyl sulfate and 2.16 g. of 3-ethyl-5-ω-acetanilido-methylene-rhodanine were dissolved in a mixture of 25 ml. of pyridine and 2.5 ml. of triethylamine and the solution heated to reflux for 45 minutes. After cooling overnight, the crude dye was collected on a buckner, washed with ethyl alcohol and crystallized from dimethylformamide. 1.5 g. of pure dye were obtained. M.P. = 154°-5° C. ν max. − 489 nm. (ethyl alcohol-dimethylformamide).

EXAMPLE 22

2-p-diethyl-amino-styryl-3-ethyl-5,7-dichloro-6-methyl-benzoxazole ethyl-sulfate A mixture of 3.6 g. of 2,6-dimethyl-3-ethyl-5,7-dichloro-benzoxazole ethyl-sulfate and 1.77 g. of p-diethylaminobenzaldehyde in 10 ml. of acetic anhydride and 5 ml. of acetic acid was boiled for 10 minutes.

After cooling, the reaction mixture was poured into ethyl ether; the pick cake, thus obtained, was ground in a mortar by washing with ethyl ether, collected on a buckner and dried. The raw dye was purified by washing it repeatedly with ethyl alcohol. 3.5 g. of pure dye were obtained with ethyl alcohol. λ max. = 525 nm. (ethyl alcohol).

EXAMPLE 23

3,3'-diethyl-5,6-5',6'-tetrachloro-thiacarbocyanine ethylsulfate

A mixture of 2.2 g. of 2-methyl-5,6-dichlorobenzothiazole and 2 ml. of diethylsulfate was heated at 120° C. for 20 minutes. After cooling, the pick cake was ground in a mortar by washing with ethyl ether and dried. The solid product, thus obtained, was dissolved in 15 ml. of anhydrous pyridine and 1.8 ml. of triethylorthoformiate and the solution heated to reflux for 40 minutes. After cooling, the crude dye was precipitated with a large quantity of ethyl ether, collected on a filter and dried in a desicator. After boiling repeatedly with ethyl alcohol and ethyl ether, 0.8 g. of pure dye was obtained. M.P. - 260°–270° C. λ max. = 578 nm. (ethyl alcohol).

EXAMPLE 24

3,3'-diethyl-5,6-5'-6'-tetrachloro-thiacarbocyanine bromide

The dye was prepared as reported in Example 23, precipitating the dye with a potassium bromide aqueous solution. M.P. = 233°–238° C. λ max. - 568 nm. (ethyl alcohol).

EXAMPLE 25

3,3',9 -triethyl-5,6-5',6'-tetrachloro-thiacarbocyanine ethyl-sulfate

A mixture of 2.2 g. of 2-methyl-5,6-dichlorobenzothiazole and 2 ml. of diethylsulfate was heated at 120° C. for 20 minutes; the pick cake, obtained by cooling, was ground in a mortar by washing with ether and dried. The solid, thus obtained, was dissolved in 20 ml. of anhydrous pyridine and 2 ml. of triethylorthopropionate and the solution boiled for 40 minutes. After cooling, the reaction mixture was poured into ethyl ether; the crude dye was purified by boiling repeatedly with water. 0.5 g. of pure dye was obtained. M. P. = 134° - 139° C. λ max. = 5.77 nm. (ethyl alcohol).

EXAMPLE 26

3,3',9-triethyl-5,6-5',6'-tetrachloro-thiacarbocyanine-p-toluene-sulfonate The dye was prepared as reported in Example 25, by using ethyl-p-toluene-sulfonate, instead of diethyl-sulfate, as quaternary agent. M.P. = 129°–133° C. λ max. = 589 nm. (ethyl alcohol).

EXAMPLE 27

3,3'-diethyl-5,7-5',7'-tetrachloro-thia-carbocyanine iodide

The dye was prepared as described in Example 23, using 2-methyl-5,7-dichloro-benzothiazole instead of 2-methyl-5,6-dichloro-benzothiazole and employing potassium iodide as precipitating agent of the dye. M.P. = 234°–240° C. λ max. − 569 nm. (ethyl alcohol).

EXAMPLE 28

3,3',9-triethyl-5,7-5',7'-tetrachloro-carbocyanine iodide

The dye was prepared as described in Example 25, using 2-methyl-5,7-dichloro-benzothiazole, instead of 2-methyl-5,6-dichloro-benzothiazole and precipitating the crude dye with an aqueous solution of potassium iodide. M.P. = 225°–230° C. λ max. − 561 nm. (ethyl alcohol).

EXAMPLE 29

2-methyl-5,7-dichloro-benzoxazole

A mixture of 61.8 g of 2-acetylamino-4,6-dichlorophenol and 4.12 g of anhydrous sodium acetate was heated for some minutes, obtaining a liquid slurry which was distilled under reduced pressure, by collecting the fraction distilled between 145° - 155° C at 1,4 mm Hg. The distilled oil upon standing became a solid which was crystallized from ligroin, obtaining 28 g of 2-methyl-5,7-dichloro-benzoxazole. M.P. = 110° - 113° C.

Percent analysis - C% Calc. 47,56, Found 47,41. H% 2,49, 2.54. N% 6,93, 6,90.

EXAMPLE 30

2-methyl-3-ethyl-5,7-dichloro-benzoxazole ethyl-sulphate.

A mixture of 2.0 g of 2-methyl-5,7-dichloro-benzoxazole and 2.5 ml of diethyl-sulphate was heated at 150° C for 40 minutes. By cooling, a solid cake was obtained. It was then ground in a mortar by washing repeatedly with ethyl ether. The product was employed without further purification.

EXAMPLE 31

3,3'-diethyl-5,7-5',7'-tetrachloro-oxa-carbocyanine perchlorate

A mixture of 3.5 g of 2-methyl-5,7-dichloro-benzoxazole-ethyl-sulphate in 15 ml of pyridine and 2.5 of triethylorthopropionate was heated to reflux for 90 minutes. After cooling, the reaction mixture was poured into ethyl ether. The yellow gum which separated was washed with ethyl ether and dissolved in a minimum quantity of hot ethyl alcohol. To this solution, an ammonium perchlorate aqueous solution was added. The dye, separated upon cooling, was collected on a buchner and washed with ethyl alcohol, water and ethyl ether. 0.1 g of dye was obtained having M.P. = 268° - 271° C. λ max = 498 nm (ethyl alcohol-dimethylformamide).

EXAMPLE 32

3,3'-dimethyl-5,7-5',7'-tetrachloro-oxa-carbocyanine perchlorate

The dye was prepared as reported in the previous example using the N-methyl quaternary salt of the base. M.P. = 275° - 8° C λ max = 496 nm (ethyl-alcohol-dimethyl formamide).

The dyes of the present invention are powerful desensitizers for light-sensitive silver halide emulsions and therefore can be used in those photographic elements wherein desensitization is required, such as for instance in the manufacture of emulsions used for the production of direct positive images, as described by Kendall and col. in U.S. Pat. No. 2,541,472 or in U.S. Pat. No. 2,669,515 and by Hillson and col. in U.S. Pat. No. 3,062,651, etc.

The cyanine dyes of this invention, such as for instance those represented by examples 11, 12, 13, 14, 18, 24, 27, 28 are useful electron acceptor spectral sensitizers for direct positive emulsions, since the direct positive emulsions, which contain them, have an improved sensitivity.

To prepare photographic emulsions, the dyes according to the present invention are conveniently incorporated into the finished emulsions and of course uniformly distributed throughout the emulsion. The methods of incorporating the dyes into the emulsions are quite easy and well known to those skilled in the art. It is convenient to add the dyes, e.g., under the form of solutions in an appropriate solvent selected among those having no harmful effect upon the finished emulsion. Methanol, ethanol, isopropyl alcohol, pyridine, etc., alone or in combinatin, are useful solvents to dissolve the dyes according to the present invention.

The emulsions to be used with the new dyes of this invention can be all those prepared using natural hydrophilic colloids as silver halide dispersing media, such as gelatin, albumin, agar-agar, arabic gum, synthetic alginic acids, such as for instance polyvinyl alcohol, polyvinyl pyrrolidone, cellulose esters, partially hydrolized cellulose acetate, etc.

The concentration of the new dyes in the emulsion may largely vary: from 10 to 1000 mg. per mole of silver halide. The specific concentration will vary according to the type of the emulsion to be used and according to the required effects.

The most convenient concentration of the dye for each given emulsion can be easily determined by making concentration series and relative measurements and examinations which are well-known to those skilled in the art. The emulsion containing the dyes according to this invention can be conveniently coated on any support material used for the production of photographic materials, such as paper, glass, cellulose acetate, cellulose nitrate, film-forming synthetic resins, polyesters, polyamides, polystyroles, etc.

To prepare a silver halide emulsion desensitized with one of our dyes, we proceeded in the following way: a number of dyes according to the present invention was separately incorporated in an emulsion in a ratio of 12 or 24 or 36 mg. of dye per Kg. of finished emulsion. The dyes were added under the form of solutions and uniformly incorporated throughout the emulsion under stirring. Sometimes higher or lower concentration may be necessary to ensure the desired degree of desensitization.

Our invention is further illustrated by the following Table 1 which reports the relative sensitivity data (desensitization) expressed in log it (°) produced in silver halide emulsions of the bromo-iodide and chloro-bromide type by the dyes of the present invention, added to the emulsion in the above-mentioned way.

(°) Minus sign means lower sensitivity.

After digestion at 50° C. for 10', the emulsions were coated on a cellulose acetate film support. A comparison test coating was made of each emulsion containing no densitizing dye. A sample of each coating was exposed to a sensitometer and in a spectrograph and then developed in the Ferrania R 6 developer, for 6 minutes at 20° C, having the following composition:

| | | |
|---|---|---|
| Metol | 1 | g. |
| Sodium sulfite, anhydrous | 25 | g. |
| Hydroquinone | 3.5 | g. |
| Sodium carbonate, anhydrous | 25 | g. |
| Potassium bromide | 0.7 | g. |
| Water to make | 1,000 | ml. |

(when the emulsion was of the chloro-bromide type) and with the Ferrania R 18 developer, for 12 minutes at 20° C., having the following composition:

| | | |
|---|---|---|
| Metol | 2 | g. |
| Sodium sulfite, anhydrous | 100 | g. |
| Hydroquinone | 5 | g. |

-continued

| | | |
|---|---|---|
| Borax | 2 | g. |
| Water to make | 1,000 | ml. |

(when the emulsion was of the bromo:iodide type).

TABLE I

| Dye Example No. | Dye Concentration mg/Kg. em. | Emulsion Type | Relative Sensitivity Expressed in log It |
|---|---|---|---|
| without any dye addition | — | bromo-iodide | TEST |
| 13 | 24 | " | −0.37 |
| 17 | 24 | " | −1.18 |
| 18 | 24 | " | −0.25 |
| 20 | 24 | " | −1.66 |
| 22 | 24 | " | −0.03 |
| without any dye addition | — | chloro-bromide | TEST |
| 17 | 24 | " | −0.68 |
| 20 | 24 | " | −0.85 |
| 22 | 24 | " | −0.03 |

The used bromo-iodide emulsion contained 96% bromide and 4 % iodide and the chloro-bromide one, 89.2 % chloride and 10.8 % bromide. From the data of Table 1, we can see that some representative dyes of this invention cause a desensitization of more than 80% in the emulsions containing such dyes. We can give evidence in the same way that also the other dyes of the present invention are silver halide emulsion desensitizers. Though both emulsions selected for our tests are made of silver halide and gelatin, it should be understood that the desensitizers of the present invention can be used to advantage in emulsions wherein gelatin is substituted with hydrophilic colloids, of the type mentioned above as possible or partial substitutes of gelatin.

The dyes according to the present invention are useful electron acceptor spectral sensitizers and useful halogen acceptor sensitizers which can be used in all types of direct positive emulsions.

According to the present invention, improved direct positive emulsions can be obtained by introducing one or more cyanine dyes of this invention into a suitable fogged silver halide emulsion. The emulsion can be fogged in any way known to those skilled in the art, such as for instance by means of light, or of chemical fogging agents, such as for instance stannous chloride, formaldehyde, thiourea dioxide, and the like. The emulsions can be fogged also by addition of a reducing agent, such as those described above, and of a metal more electropositive than silver, such as a gold salt, for instance, potassium chloro-aurate, as described in the British Pat. No. 723,019.

The dyes of this invention can be incorporated also in direct positive emulsions of the type wherein the silver halide grains have a silver salt central core insoluble in water and an outer shell consisting of a fogged silver salt insoluble in water which can be developed to metallic silver without any exposure. The dyes according to the present invention are preferably incorporated into the fogged outer shell. These emulsions can be prepared in several ways, such as for instance as described in U.S. Pat. No. 3,367,778.

The dyes according to the present invention are electron acceptor spectral sensitizers which can be used also in high-sensitivity direct positive emulsions, such as those described in U.S. Pat. No. 3,501,307.

The silver halides used for the preparation of the direct positive photographic emulsions, according to this invention, comprise any type of silver halides, such as for instance silver bromide, silver iodide, silver chloride, silver chloro-iodide, silver bromo-iodide, silver bromo-chloride, and the like.

The silver halide grains may be regular and of every crystalline shape, such as cubical or octahedral shape, as described in U.S. Pat. No. 3,501,306. Such grains advantageously have a narrow distribution curve, as described in U.S. Pat. No. 3,501,305. It is further known that emulsions having silver halide grains with an average diameter lower than 1 μ, preferably 0.5 μ, are particularly useful. The dyes of the present invention can be used to advantage in the direct positive emulsions described in Italian patent application Ser. No. 49,377A/74, filed on Mar. 21, 1974.

The merocyanine dyes of the present invention (such as for instance example 21) can be used in the direct positive emulsions of the above-mentioned type as halogen acceptors, i.e., as dyes preferably having a half-wave polarographic cathodic potential lowr than −0.9 V., while the difference between the cathodic and the anodic half-wave polarographic potentials is higher than 1.5 V in absolute value.

The types of emulsions wherein our dyes can increase the sensitivity by means of their halogen accepting power are those described for instance in: U.S. Pat. Nos. 3,501,307; 3,531,290 and 3,537,858, and in the French Pat. Nos. 1,518,094 and 1,520,822 and in Italian patent application Ser. No. 49,377A/74, filed on Mar. 21, 1974.

The direct positive emulsions sensitized with the dyes according to the present invention may also contain color-formers dissolved in the layer in an appropriate solvent or added as dispersions in a crystalloid solvent, such as for instance di-n-butylphthalate, tricresylphosphate, etc. Examples of direct positive emulsions containing sensitizers of this invention and color couplers are described in Italian patent application Ser. No. 49,336A/74, filed on Mar. 21, 1974.

A certain number of dyes of the present invention were photographically tested as electron acceptors and spectral sensitizers for fogged direct positive emulsions by adding the sensitizers dissolved in an appropriate solvent in the concentration reported in Table II of mg. of the dye per mole of Ag. to an emulsion of the type described in Example 1b of Ilalian patent application Ser. No. 49,377A/74, filed on Mar. 21, 1974. The final emulsion, ready to be coated. ha a pH = 6 and a pAg - 8.5. After having been coated, a sample of each coating was exposed in a sensitometer and in a spectrograph using a tungsten lamp, developed at 20° C for 3 minutes with the Kodak D-19b developer having the following composition:

| | | |
|---|---|---|
| Metol | 2.2 | g. |
| Sodium sulfite, anhydrous | 72 | g. |
| Hydroquinone | 8.8 | g. |
| Sodium carbonate, anhydrous | 48 | g. |
| potassium bromide | 4 | g. |
| Water to make | 1,000 | ml. | then fixed, washed and dried. The results thereof are reported in Table II. The same emulsion containing the same quantity of yellow-pinacryptole as electron acceptor was taken as a reference test. The sensitivity is therefore expressed in log It relative to the yellow-pinacryptole containing coating which is taken as reference. A minus sign means lower sensitivity and a plus sign means higher sensitivity.

TABLE II

| Example | Concentration mg/mole Ag | Potentials (°) Anodic | Potentials (°) Cathodic | Relative sensitivity | $D_{max.}$ | λ max. of sensitization |
|---|---|---|---|---|---|---|
| yellow pina | 500 | — | — | TEST | 1.80 | — |
| 11 | 500 | +0.92 | −0.68 | +0.9 | 1.90 | 530 nm. |
| 12 | 500 | — | — | +0.9 | 1.90 | 530 nm. |
| 13 | 500 | +0.90 | −0.70 | +0.9 | 1.85 | 535 nm. |
| 14 | 500 | — | — | +0.9 | 1.80 | 535 nm. |
| 15 | 500 | +0.89 | −0.87 | 0.0 | 1.80 | 530 nm. |
| 16 | 500 | — | — | low invers. | — | — |
| 17 | 500 | +0.86 | −0.38 | 0.0 | 1.80 | not def.ble |
| 18 | 500 | +1.13 | −0.76 | +0.8 | 1.75 | 540 nm. |
| 19 | 500 | +1.15 | −0.89 | low invers. | — | — |
| 20 | 500 | — | — | 0.0 | 2.00 | not def.ble |
| 23 | 500 | — | — | −0.5 | 1.80 | " |
| 24 | 500 | +0.82 | −0.50 | +0.7 | 1.75 | 610 nm. (550 nm.) |
| 25 | 500 | +0.90 | −0.38 | low invers. | — | — |
| 26 | 500 | +0.86 | −0.78 | −0.3 | 1.80 | — |
| 27 | 500 | +1.07 | −0.51 | +0.5 | 1.85 | 610 nm. (550 nm.) |
| 28 | 500 | +0.83 | −0.60 | +0.5 | 1.85 | 645 nm. (560 nm.) |
| 31 | 500 | +1.20 | −0.79 | +0.6 | 1.80 | 555 nm |
| 32 | 500 | — | — | +0.3 | 2.00 | 540 nm |

(°) The polarographic anodic and cathodic potential values, reported in Table II are referred to the absolute potential scale.
As described in Tani and Kikuchi in Phot. Sci. Engng. 11 (3) 129 (1967) for symmetrical cyanine dyes and by Shiba and Kubodera in "Preprint (NB 12)" of I.C.P.S. - 1970, Moscow, for merocyanine dyes, the polarographic potential values are strictly referred to their electronic energy levels and therefore to their photographic behavior.
The measurements can be carried out following the methods reported in P. Delahay, "New instrumental methods in Electrochemistry", Interscience Publ. Inc., New York, 1954 and those reported in I. M. Koltoff and J. J. Lingane, "Polarography", 2nd edition, Interscience Publ. Inc., New York and in R. N. Adams, "Electrochemistry at solid electrode", Marcel Dekker, Inc., New York, 1969.
The cathodic half-wave polarograhic potential value (E red) is the value in volts corresponding to the more positive cathodic wave. This value is obtained by using a dropping mercury electrode (DME) in a solution of $1.10^{-4}$. $10^{-6}$ M of the electron acceptor in a suitable solvent, as methyl alcohol containing lithium chloride (0.05 M) at 20° C.
The anodic half-peak voltammetric potential value (E ox) is the value in volts corresponding to the more negative anodic wave.
This value is determined by using a carbon paste electrode in an aqueous solvent solution of $1.10^{-4} + 1.10^{-6}$ M of the electron acceptor or the halogen acceptor, for example a 50% methanolic solution, containing sodium acetate (0.05 M) and acetic acid (0.005 M). The reference electrode is an Ag . AgCl — KCl (s) in water at 20° C.
The electron acceptors useful according to this invention have an anodic (E ox) and a cathodic (E red) polarographic half-wave potential, the sum of which is a positive number. Preferably, the halogen acceptor according to our invention is a dye whose cathodic half-wave polarographic potential is more negative than −0.9 V, while the difference between the cathodic and the anodic half-wave polarographic potentials is higher than 1.5 V in absolute value. (potential values are referred to the absolute potential scale).

The dyes of the present invention can be used as filter dye useful in photography. For instance, solutions of dyes of Example Nos. 13, 18, 19 and 22 are bleached by R6 developer solutions having the above-reported composition.

FIG. 1 shows the Jarrel-Ash spectra of some electron acceptor spectral sensitizers and FIG. 2, the Zeiss spectra of some other electron acceptor spectral sensitizers, all tested in the above-described experimental conditions whose data are reported in Table II.

EXAMPLES 33-37

A photographic cubic grain silver bromo-iodide emulsion, having a mean grain size of 0.2μ, was prepared by the double-jet technique in the following way: To a solution A consisting of:

| (A) | KBr 0.01M | 500 | ml. |
|---|---|---|---|
| | Inert gelatin | 10 | g. |
| | HNO$_3$ 1 M | 20 | ml. | solutions B and C, respectively consisting of:

| (B) | H$_2$O | 500 | ml. |
|---|---|---|---|
| | KBr | 116.02 | g. |
| | KI | 4.14 | g. |
| | Inert gelatin | 20 | g. |
| (C) | AgNO$_3$ 2 M | 500 | ml. | were added simultaneously in 35 minutes at 70° C.

During precipitation, pAg was kept at the value measured in solution A prior to precipitation (−7 mV at 70° C.).

At the end of the precipitation, the emulsion was flocculated by adding Na$_2$SO$_4$, washed, and redispersed in a sufficient quantity of water and inert gelatin to obtain a final silver content of 3%, with a silver to gelatin ratio of 0.36. pH = 6.2; pAg = 8.2.

Upon addition of 1 molar sulfuric acid and 1 molar potassium bromide, respectively, the pH of the emulsion was adjusted to 4.5 and the pAg to 10.5. After addition of 300 × 10$^{-6}$ mole of the gold thiocyanate complex (comprising 1 mole Au/80 moles of NH$_4$CNS) per mole of silver, the emulsion was heated at 65° C. for 30 minutes.

Dyes A, B, C, and D* were added to this emulsion from 0.1% by weight methanol solutions in amounts of 400 mg dye/mole of silver halide. Strips of polyethylene terephthalate base were coated with the above described emulsion containing:

33. No dye,
34. Dye A, 20 )
35. Dye B, °°)
36. Dye C, and
37. Dye D.

All strips were identically exposed with a tungsten lamp and then developed for 3 minutes at 20° C in E K Developer D 19-b, previously described, then fixed, washed and dried. The results were as follows:

| | | Density in exposure area | Density in non-exposure area |
|---|---|---|---|
| 33. | Negative image | 2.25 | 1.00 |
| 34. | Negative image | 1.68 | 0.68 |
| 35. | Negative image and positive image | 0.60 | 0.54 |

| | Density in exposure area | Density in non-exposure area |
|---|---|---|
| -continued | | |
| 36. Positive image | 0.13 | 0.62 |
| 37. Positive image | 0.26 | 0.64 |

The superiority of the dihalo-substituted compounds can clearly be seen from these examples, in that only the dihalo compounds generate low fog images and essentially positive images within direct positive emulsions.

What we claim is:

1. A light-sensitive fogged direct positive silver halide emulsion containing a sensitizing amount of at least one cyanine dye selected from the formulae:

or wherein
Y is an oxygen or sulfur atom,
$n$ is 2, 3, or 4,
$m$ is 1 or 2,
R and $R_1$ are independently halogen atoms,
$R_2$ is H or an alkyl group of 1 to 4 carbon atoms,
$R_3$ is selected from the group consisting of acylic hydrocarbon, alkyl-aryl, or aryl groups,
$R_4$ is H or alkyl of 1 to 3 carbon atoms,
Z represents the non-metallic atoms required to complete a 5 or 6 membered desensitizing heterocyclic nucleus, and
X is an acid anion.

2. The light-sensitive fogged direct positive silver halide emulsion of claim 1 containing a sensitizing amount of at least one dye of the formula:

wherein:
Y is an oxygen or sulfur atom,
$n$ is 2, 3, or 4,
R and $R_1$ independently represent a halogen atom,
$R_2$ is H or an alkyl group of 1 to 4 carbon atoms,
$R_3$ represents an acyclic hydrocarbon, alkyl-aryl, or aryl group,
$R_4$ is H or alkyl of 1 to 3 carbon atoms, and
X represents an acid anion.

3. The emulsion of claim 2 wherein R and $R_1$ are independently selected from the group consisting of Cl and Br and $R_3$ is an alkyl group of 1 to 12 carbon atoms.

4. The emulsion of claim 3 wherein R and $R_1$ are the same halogen and $R_3$ is alkyl of 1 to 4 carbon atoms.

5. The light-sensitive fogged direct positive silver halide emulsion of claim 1 containing a sensitizing amount of at least one dye of the formula:

wherein:
m is 1 or 2,
Z represents the C, S, O, Se, or N atoms necessary to complete a 5- or 6-membered desensitizing heterocyclic nucleus,
Y is an oxygen or sulfur atom,
n is 2, 3, or 4,
R and $R_1$ independently represent a halogen atom,
$R_2$ is H or an alkyl group of 1 to 4 carbon atoms,
$R_3$ represents an acyclic hydrocarbon, alkyl aryl, or aryl group, and
X represents an acid anion.

6. A light-sensitive fogged direct positive silver halide emulsion containing a sensitizing amount of 3,3'-diethyl-5,7-5',7'-tetrabromo-oxacarbocyanine perchlorate.

7. A light-sensitive fogged direct positive silver halide emulsion containing a sensitizing amount of 3,3'-dimethyl-5,7-5',7'-tetrabromo-9-ethyl-oxacarbocyanine perchlorate.

8. A light-sensitive fogged direct positive silver halide emulsion containing a sensitizing amount of 3,3'-diethyl-5,7-5',7'-tetrachloro-6,6'-dimethyloxacarbocyanine ethylsulfate.

9. A light-sensitive fogged direct positive silver halide emulsion containing a sensitizing amount of 3,3'-diethyl-5,6-5',6'-tetrachloro-thiacarbocyanine bromide.

10. A light-sensitive fogged direct positive silver halide emulsion containing a sensitizing amount of 3,3'-diethyl-5,7-5',7'-tetrachloro-thiocarbocyanine iodide.

11. A light-sensitive fogged direct positive silver halide emulsion containing a sensitizing amount of 3,3',9-triethyl-5,7-5',7'-tetrachloro-thiocarbocyanine iodide.

12. The light-sensitive fogged direct positive silver halide emulsion of claim 1 also containing a color coupler.

13. A direct positive photographic element containing at least one layer of the light-sensitive emulsion of claim 1.

* * * * *

UNITED STATES PATENT AND TRADEMARK OFFICE
CERTIFICATE OF CORRECTION

PATENT NO. : 4,110,116
DATED     : August 29, 1978
INVENTOR(S) : Paolo Beretta and Luigi Valbusa It is certified that error appears in the above-identified patent and that said Letters Patent are hereby corrected as shown below:

Column 2, line 2, "ane" should be --and--;

Column 6, line 56, "N,M-di-substituted-p-amino-cinnamaldehyde" should be --N,N-di-substituted-p-amino-cinnamaldehyde--;

Column 13, line 55, "$C_2H_5SO_4^{\oplus}$" should be --$C_2H_5SO_4^{\ominus}$--;

Column 15, line 48, "5.77 nm" should be --577 nm--;

Column 17, line 17, "$C_2^5$" should be --$C_2H_5$--; and

Column 18, line 51, "densitizing" should be --desensitizing--.

Signed and Sealed this

Seventeenth Day of June 1980

[SEAL]

Attest:

SIDNEY A. DIAMOND

Attesting Officer

Commissioner of Patents and Trademarks